Figure 1:
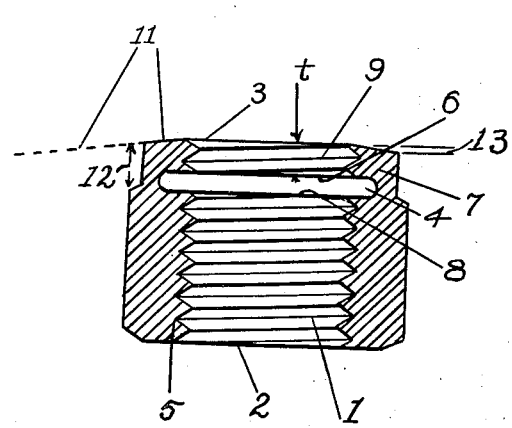

Jan. 1, 1946.   R. T. HOSKING   2,391,902
LOCK-NUT
Filed June 2, 1943

RICHARD T. HOSKING,
INVENTOR,

BY George B. Willcox
ATTORNEY

Patented Jan. 1, 1946

2,391,902

UNITED STATES PATENT OFFICE 2,391,902

LOCK NUT

Richard T. Hosking, Wilmette, Ill.

Application June 2, 1943, Serial No. 489,390

1 Claim. (Cl. 151—21)

This invention relates to improvements in self-locking nuts of a known general type characterized by having a one-piece body threaded internally, the thread being of uniform pitch throughout its length. The thread is interrupted by being separated into two helical portions spaced apart by an internal peripheral groove.

At one side of the groove is a threaded base portion called the "main section" or body; and at the other side is another threaded portion known as the "locking section."

The threads in the two sections are made slightly out-of-phase with each other by compressing the nut and displacing the sections in their axial direction so as to narrow the groove and bring the ends of the threads in the locking portion and body portion slightly closer together.

It was expected that the resulting off-phase condition of the locking section relatively to the body portion would take up all lost motion between the bolt threads and the threads in the body portion; and that a small additional amount of displacement of the locking section would cause the nut threads on one side of the groove and the locking section threads on the other side to respectively engage opposite faces of the bolt thread and so set up a frictional clamping vise-like action that would prevent the nut from loosening by vibration. However, it was found in practice that the degree of thread play required to be taken up varied with individual units of the same manufactured lot of bolts and nuts, due to wear of thread-cutting tools, and consequently the earlier locking sections were not dependable because of inability to adapt themselves to such variations. Attempts to overcome the difficulty were made from time to time, but without success, as will be explained further in the specifications.

By research and experimenting I have found hitherto undetermined causes of such trouble and have devised a simple, novel, effective remedy which is embodied in a locking section of improved design. It locks adequately at any point along an ordinary commercial bolt yet will not freeze to the bolt threads nor harmfully twist the bolt or fracture the nut. Also, it can be tightened down to the full bolt load capacity without injury to the locking member.

My improvement includes also a gauging means for the locking section that enables each nut of a lot to exert the same degree of off-phase thread frictioning action despite casual variations in the thread sizes of commercial bolts. A lock-nut employing this locking section can be unscrewed easily and may be re-used many times without injury to the nut or bolt threads.

So far as I am aware, these advantages have not been attained heretofore in such lock-nut structures.

With the foregoing and certain other objects in view, which appear later in the specifications, my invention comprises the devices described and claimed and the equivalents thereof.

Figure 2:
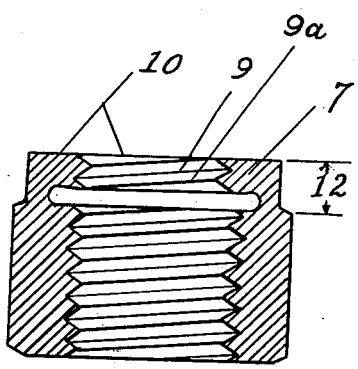

In the drawing Fig. 1 is a longitudinal sectional view showing a standard nut in an intermediate stage of manufacture; and Fig. 2 is a similar view showing the completed lock-nut according to my invention, ready to be applied to a bolt.

Referring now to the unfinished form, Fig. 1, claimed herein as a threaded nut in an intermediate stage of manufacture, it is seen that a nut of ordinary construction is bored and internally threaded throughout its length from inner face 2 to outer face 3, and is provided internally with a thread-interrupting groove 4, the diameter of which is at least as great as the root diameter 5 of the internal screw thread.

The portion of the nut between upper wall 6 of groove 4 and the outer face 3 of the nut presents a locking section 7 and the portion between the lower wall 8 of the groove and the inner face 2 is the "main section" or body.

According to my improvement the thickness, $t$, of the locking section accommodates only one convolution, 9, of the thread. The advantage of this single convolution arrangement in the locking section 7 will be explained now and compared with earlier devices.

An earlier kind of locking section had several turns of thread, following the erroneous idea that several threads should give dependable locking action. But in practice locking sections with multiple threads actually tended to "freeze" the nut and bolt together. This was due principally to the fact that standard bolts and nuts differ as much as seven thousandths under or over, because thread-cutting dies wear with use and cause the bolts to come progressively larger; also, in threading a lot of nuts, the tap wears and the nuts come progressively smaller. Some nuts with multiple threads in their locking sections when taken at random from a lot would function as desired, but others of the same lot would seize or "freeze" and damage the threads if unscrewed by powerful wrenching force. Others of the same lot would be too loose and inadequate against vibration.

Another difficulty with such locking sections with multiple threads was that the several threads would become displaced relatively to each other with an undesirable accordion-like displacement while the nut was being compressed to produce the desired out-of-phase condition. Such localized displacement of multiple threads in the locking section caused unequal bearing stresses on the bolt threads engaged by them, and the locking effect was uncertain and erratic.

I have discovered what seems to have escaped those skilled in the art, namely, that important and hitherto unobvious advantages can be attained by providing the locking section 7 with only a single turn 9 or substantially one turn of thread; instead of employing several turns, as in the earlier device alluded to.

I have found that every additional thread in the locking section beyond one complete turn, 9, is almost sure to become more or less displaced out of its original helical form in the accordion-like fashion just alluded to with respect to the next adjacent convolution, while the nut is being compressed for the purpose of giving the threads at the two sides, 6, 8, of groove 4 an out-of-phase relationship, as has been explained. The result of such displacement was oftentimes erratic and undependable locking action, due to local binding among the successive individual turns in the locking section with corresponding threads on the bolt. In aggravated cases the nut would freeze to the bolt.

But when a single thread 9 is used, only so much resistance can develop against unscrewing as will lock the nut against jarring loose; and, unlike multiple threads, the nut can not freeze.

For these and other reasons that will be apparent a locking section with a single complete convolution of the thread, distinguished from multiple turns, improves smoothness and ease of screwing and unscrewing the nut and also increases the effectiveness of locking. Uniform face-to-face thread bearing is secured all around the bolt circle, since only straight axial pull is exerted, and the nut thread has no tendency to injure the bolt thread engaged by it.

Disadvantages were also inherent in another early type of lock-nut wherein the locking section was made so thin as to accommodate substantially less than a full turn of internal thread. Here the bolt was subjected to load stresses that were off-center.

The effect of having only a fractional part of one convolution of thread surface in the locking section was to exert longitudinal pull off-center along one side only of the bolt. When the nut was set down tightly on a work piece thrusts were created by the fractional bearing surface in a direction transverse to the axis and sidewise against the bolt. Such transverse stresses varied in degree at different locations along the bolt due to the existing differences in thread clearance; hence the nut would have different locking effects at different places along the length of the bolt.

Also, when such a locking section with only a fractional part of one convolution available for useful work was being tightened down against a work piece, the eccentricity just mentioned again resulted in non-uniform action of the locking section, and the locking effect was not dependable.

Having pointed out the defective operating features of the two earlier types of threaded locking sections, it will be appeciated that in my improved arrangement the single thread 9 of the locking section 7 has its bearing throughout the helical length of only one convolution of the bolt thread and consequently its pressure is exerted equally all around a single convolution of the bolt thread.

The single thread of the locking section acts on a single thread of the bolt by a pull straight along the axis. There is no eccentric loading of the engaged nut and bolt threads, and consequently the nut thread is not urged sidewise into the bolt thread. Casual differences in bolt and nut thread sizes do not hamper the locking operation, and the nut can not be made to freeze to the bolt.

The problem of devising limit-gauge means for compressing the locking section endwise so as to put the two thread systems into proper out-of-phase condition, regardless of commercial variations in bolt and nut threads, did not have an obvious solution, since much depends on the sameness of the metal structure, the length or height of the nut, and the exact throw of the press.

I have solved the gauging problem by the simplified means shown in Fig. 1. Member 7 is faced off with a camber 11 at such a slope from the thread circle to the outside diameter 12 that the rise 13 of the camber shall equal the off-phase displacement to be imparted to thread 9 of the locking section.

When the camber 11 of the locking section is pressed down flat as shown at 10, Fig. 2, the upright annular ring portion defined at 12 acts as a limiting stop, halting any further movement by the press plunger when the face 3 has been moved down a distance equal to the rise 13. The force which the press is permitted to exert may be adjusted in known manner for that purpose.

By using locking section 7 as a gauge for limiting the displacement of its own thread 9, the compressing operation is standardized and assures for all nuts of a manufactured lot substantially identical locking effects.

After being flattened, the nut is hardened and the two cooperating portions 1 and 7 are thereby made permanently rigid and unyieldable in relation to each other; as distinguished from known earlier types of lock-nuts wherein the locking section depended for its action upon a relative yielding or spring effect between body 1 and section 7.

Reference will now be made to Fig. 2.

In use, the nut spins onto the bolt freely until the first thread of the bolt, which is omitted from the drawing to simplify the disclosure, comes into engagement with the bottom face 9a of the out-of-phase single convolution thread 9. Thereupon an appropriate amount of binding resistance is created due to the slight out-of-phase relationship of the nut threads 1 and the single thread 9 of the locking section 7.

With a moderate amount of wrench force the nut can now be advanced for the full length of the bolt thread. When brought up tight against the work piece and even when tightened to the full load capacity of nut 1 the locking effect of thread 9 will remain substantially the same. The amount of the off-phase displacement of thread 9 is the feature that determines the amount of locking effect, and such amount is substantially constant under all conditions of use of the nut even on commercially variable bolt threads.

I claim:

A self-locking threaded nut in an intermediate stage of manufacture comprising a main section and a locking section uniformly threaded and separated by an internal thread-interrupting groove, the locking section having a single convolution of the thread; the locking section presenting stop means for limit-gauging the amount of endwise displacement allowed the locking section in order to put into predetermined relationship the thread portions of the body and locking section; such stop means comprising an end face of the locking section cambered downwardly and outwardly from thread circle to periphery, the rise of such camber being equal to the amount of off-phase displacement desired to be imparted to the thread of the locking section relatively to the thread of the body when said end face is compressed to the limit of the said stop.

RICHARD T. HOSKING.